(12) United States Patent
Christ (10) Patent No.: US 12,449,648 B2
(45) Date of Patent: Oct. 21, 2025

(54) INVERTED MICROSCOPE

(71) Applicant: LEICA MICROSYSTEMS CMS GMBH, Wetzlar (DE)

(72) Inventor: Stefan Christ, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 404 days.

(21) Appl. No.: 18/018,907

(22) PCT Filed: Aug. 4, 2021

(86) PCT No.: PCT/EP2021/071802
§ 371 (c)(1),
(2) Date: Jan. 31, 2023

(87) PCT Pub. No.: WO2022/029194
PCT Pub. Date: Feb. 10, 2022

(65) Prior Publication Data
US 2023/0244069 A1    Aug. 3, 2023

(30) Foreign Application Priority Data
Aug. 6, 2020    (DE) ..................... 10 2020 120 790.5

(51) Int. Cl.
*G02B 21/00* (2006.01)
*G02B 21/08* (2006.01)
(Continued)

(52) U.S. Cl.
CPC ......... *G02B 21/0088* (2013.01); *G02B 21/28* (2013.01); *G02B 21/30* (2013.01); *G02B 21/086* (2013.01)

(58) Field of Classification Search
CPC .... G02B 21/0088; G02B 21/28; G02B 21/30; G02B 21/086
(Continued)

(56) References Cited

U.S. PATENT DOCUMENTS

2004/0158234 A1\*  8/2004  Previn ................. A61F 9/00821
606/6
2006/0023299 A1    2/2006  Muraki
(Continued)

FOREIGN PATENT DOCUMENTS

EP    2423673 A1    2/2012
EP    3599632 A1    1/2020
(Continued)

OTHER PUBLICATIONS

JP-2010091738-A—Apr. 2010—Harada—English translation.*

*Primary Examiner* — Sharrief I Broome
(74) *Attorney, Agent, or Firm* — LEYDIG, VOIT & MAYER, LTD.

(57) ABSTRACT

An inverted microscope is provided, the inverted microscope including a microscope stage which includes an opening prepared for transmitted light illumination and which is designed to receive a sample holder and an imaging optical unit arranged below the microscope stage. A closed lower incubation space which surrounds at least the imaging optical unit is arranged adjacent to a lower side of the microscope stage. The inverted microscope is configured such that a temperature in the lower incubation space is adjustable to a specifiable target temperature, for the purposes of which at least one temperature sensor is arranged in the lower incubation space, the measurement signal of the at least one temperature sensor serving to set the specifiable target temperature.

13 Claims, 11 Drawing Sheets

(51) Int. Cl.
*G02B 21/28* (2006.01)
*G02B 21/30* (2006.01)

(58) Field of Classification Search
USPC .......................................................... 359/368
See application file for complete search history.

(56) References Cited

U.S. PATENT DOCUMENTS

| | | | |
|---|---|---|---|
| 2006/0092506 A1 | 5/2006 | Tsuchiya et al. | |
| 2008/0247038 A1* | 10/2008 | Sasaki ................ | G02B 21/0088 |
| | | | 359/395 |
| 2013/0314778 A1* | 11/2013 | Fujii ..................... | G02B 21/28 |
| | | | 359/391 |
| 2014/0009594 A1* | 1/2014 | Kono ..................... | H04N 23/45 |
| | | | 348/79 |
| 2016/0017270 A1* | 1/2016 | Vom ....................... | C12M 41/36 |
| | | | 435/292.1 |
| 2018/0164569 A1* | 6/2018 | Brinkman .............. | G02B 21/16 |
| 2020/0144019 A1 | 5/2020 | Van Heumen et al. | |

FOREIGN PATENT DOCUMENTS

| | | |
|---|---|---|
| JP | H07-36118 U | 2/1995 |
| JP | 2010-91738 A | 4/2010 |
| JP | 2010091738 A * | 4/2010 |

* cited by examiner

INVERTED MICROSCOPE

CROSS REFERENCE TO RELATED APPLICATIONS

This application is a U.S. National Phase application under 35 U.S.C. § 371 of International Application No. PCT/EP2021/071802, filed on Aug. 4, 2021, and claims benefit to German Patent Application No. DE 10 2020 120 790.5, filed on Aug. 6, 2020. The International Application was published in German on Feb. 10, 2022 as WO 2022/029194 A1 under PCT Article 21(2).

FIELD

The present inventive concept relates to an inverted microscope comprising a microscope stage which has an opening prepared for transmitted light illumination and which is designed to receive a sample holder in particular for biological samples such as live cells, and an imaging optical unit arranged below the microscope stage.

BACKGROUND

Inverted microscopes often serve for imaging live cells that are placed in a sample holder, such as a Petri disk or a multiwell plate. The sample holder is inserted into a stage opening of the microscope stage. For this purpose, the stage can exhibit a sample receptacle that receives the sample holder and safely holds the sample holder in its position when moving the microscope stage. The transmitted light illumination radiation beam is likewise guided through this stage opening and thus through the sample. Below the microscope stage an imaging optical unit is arranged that typically comprises at least the microscope objective or an objective changer having different objectives of which one can be brought into the observation beam path. Within the framework of this application the imaging optical unit can also comprise further elements such as tube lenses, filters, etc. and also a detector for imaging, such as for example a camera.

So as to avoid stress reactions, damage or even a dying-off of the live cells, the entry of radiation and heat into the sample has to be limited to a minimum. Incubation solutions are therefore known where for example a large exterior construction that surrounds a large part of the microscope is designed as an incubated space (called a "cage incubator" in trade). Or, only a small volume is incubated above the sample or above the sample holder (called a "stage top incubator" in trade). In the case of the first-mentioned cage incubator solution, above the microscope stage a large space of the microscope surrounding the microscope stage is cut off from the environment and incubated in the shape of a chamber by supply and discharge lines, wherein the temperature, the atmosphere composition and in particular the humidity are controlled. In the stage top incubator solution however, only a very small volume above the sample holder is controlled in terms of temperature, composition of the air and humidity. In the case of the solution first mentioned, a comparatively voluminous space that surrounds large parts of the microscope from above has to be incubated, thus requiring large flow volumes in terms of air, gases, etc., that in turn consume energy and require time until a thermal equilibrium has been achieved. In contrast, the second mentioned solution comprising the "stage top incubator" focuses on a small volume and thus directly on the environment above the sample or the sample holder itself, thereby neglecting the interfaces of the sample holder toward the spaces above and below the microscope stage. The "stage top incubator" does not possess any heating of its own and has to be additionally heated externally according to the cell type (e.g. hot air or water cooler/heater) and thus requires that heat is supplied from the outside or heat is discharged.

In the cage incubator solution, the microscope stage often acts as a barrier so that considerably less incubation atmosphere flows through the area below the microscope stage than through the area above the microscope stage; in addition, the outer faces of the cage incubator as a rule are not insulated so that here too no heat can be supplied or discharged. There is an uncontrolled heat supply on account of the environmental temperature and in particular also on account of electronic components that are operated in the microscope or in the environment of the microscope.

SUMMARY

In an embodiment, the present disclosure provides an inverted microscope including a microscope stage which includes an opening prepared for transmitted light illumination and which is designed to receive a sample holder and an imaging optical unit arranged below the microscope stage. A closed lower incubation space which surrounds at least the imaging optical unit is arranged adjacent to a lower side of the microscope stage. The inverted microscope is configured such that a temperature in the lower incubation space is adjustable to a specifiable target temperature, for the purposes of which at least one temperature sensor is arranged in the lower incubation space, the measurement signal of the at least one temperature sensor serving to set the specifiable target temperature.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

When examining live cells, the microscope objectives are often designed as immersion objectives that are located in the direct proximity of the sample holder or of the examined sample. To avoid heat discharge from the sample into the objective it is known to surround the objective with a silicon cushion in which heating wires are incorporated so that the temperature of the objective can be controlled. The inventors of the present invention have recognized that this solution is expensive and wastes costly room in the space that is limited anyway, below the microscope stage and represents a challenge in terms of guiding the cables in the area of the objective revolver. The silicon cushions mentioned are also not compatible with many objectives such as the so-called MotCorr objectives that exhibit motorized lens elements for compensating varying cover glass thicknesses and/or varying indices of refraction of the nutrient solution.

The inventors of the present invention have therefore recognized that there is a demand for an improved temperature regulation for an optimized supply of the sample in the case of inverted microscopes of the type mentioned above, so as to avoid in particular stress reactions, damage or even the dying-off of the examined cells on account of heat supply or heat discharge.

An exemplary embodiment of the inventive concept comprises an inverted microscope comprising a microscope stage which has an opening prepared for transmitted light illumination and which is designed to receive a sample holder, and an imaging optical unit arranged below the microscope stage, wherein a closed lower incubation space which surrounds at least the imaging optical unit is arranged adjacent to the lower side of the microscope stage, wherein the microscope is configured such that the temperature in the lower incubation space is adjustable to a specifiable target temperature, for the purposes of which at least one temperature sensor is arranged in the incubation space, the measurement signal of the at least one temperature sensor serving to set the specified target temperature.

Embodiments of the inventive concept thus provide a closed lower incubation space that is adjacent to the lower side of the microscope stage, wherein the microscope stage itself and the sample holder arranged there can form at least a part of the interface of the lower incubation space. The incubation space is preferably otherwise insulated so as to supply and discharge as little heat as possible. The lower incubation space surrounds the imaging optical unit that—as already has been explained—comprises at least the microscope objective or a changer for several objectives.

The temperature in the lower incubation space can be set to a specified target temperature. This achieves that the sample holder that in use is adjacent to the inverted microscope can be influenced in terms of its temperature from below. In particular, if the sample holder itself forms part of the upper interface of the lower incubation space, by means of direct heat exchange, the desired temperature of the sample can be set—cells are mostly located at the bottom of the sample holder. In the context of the lower incubation space "incubation" only means that a specifiable target temperature must be able to be set in the interior of this space. Further requirements do not have to be imposed, in particular setting the composition of the atmosphere or of the humidity in the lower space is not requisite. Embodiments of the inventive concept thereby permit a temperature regulation, and in a particular embodiment, in an area below the inserted sample holder and the imaging optical unit that is present there, so that the initially mentioned heating sleeves for objectives are made redundant. For setting the temperature in the incubation space at least one temperature sensor is provided whose measurement signal serves to set the mentioned target temperature. The provision of a temperature sensor in the incubation space permits precise measurement of the temperature prevailing there and thereby a temperature control or regulation that is as precise as possible.

In an advantageous design, the microscope comprises a heating and/or cooling unit that sets the temperature in the lower incubation space. Such a heating and/or cooling unit can for example comprise a Peltier element by means of which heating or cooling can take place. Heating wires or heating coils can also be used. Also a heat exchanger arrangement having a heating and/or cooling medium is conceivable.

The heating and/or cooling unit can here be an external heating and/or cooling unit, i.e. arranged outside the lower incubation space, that is connected to the lower incubation space via at least one connecting line, it being possible by supplying and/or discharging heated and/or cooled air to set the specified target temperature in the incubation space. For this purpose it is practical to provide a fan that conducts air from the external heating and/or cooling unit into the lower incubation space. When two connecting lines are provided, air circulation can also be produced in this manner that guides from the heating and/or cooling unit into the incubation space and back again.

In another design, the heating and/or cooling unit is formed as an integrated heating and/or cooling unit, i.e. arranged inside the lower incubation space, it being possible to set the specified target temperature by heating or cooling. In this embodiment, it is not necessary to connect an external heating and/or cooling unit, instead a simple heating and/or cooling element such as a Peltier element can assume the function of setting the specified target temperature in the lower incubation space. Here also it can be appropriate to provide an air flow for example by means of a fan. This can ensure particularly homogeneous temperature conditions.

It is further appropriate, if the inverted microscope comprises a control unit that is in a communication connection to the temperature sensor in the interior of the lower incubation space so as to transmit the measurement signal produced by the temperature sensor to the control unit that in turn drives the heating and/or cooling unit so as to set the specified target temperature in the lower incubation space. The control unit can here be designed as its own independent unit, but can however also be formed as being included in the heating and/or cooling unit or integrated with it.

In an advantageous design of an embodiment of the inventive concept, the at least one temperature sensor is designed and/or arranged such that it measures the temperature at the lower side or in an area of the lower side of the sample holder to be received on the or in the microscope stage. This comprises the area below the sample holder itself and below an above-mentioned sample receptacle, that receives the sample holder, as well as the interface area of the lower side of the stage opening. A temperature can be measured hereby as precisely as possible that also corresponds to the temperature of the sample holder and thus the sample. The lower side of the microscope stage close to the opening for receiving the sample holder can for example contain a fastening means such as a cable clamp to which the probe of the temperature sensor can be attached. As an alternative or in addition, it is also possible to arrange the temperature sensor at another place inside the lower incubation space, there being oriented the temperature probe in the direction of the lower side of the microscope stage for measuring in a targeted and contactless manner the temperature in an area of the lower side of the sample holder. In principle, it is also possible to conceive using several temperature sensors, for example a first sensor measuring the temperature and its temperature values being verified by a second sensor or, however, mean values of the temperature measurement signals of the different sensors being formed or finally a second sensor being used if a first sensor fails.

As has already been indicated, a temperature sensor can be arranged on the lower side of the microscope stage and at a distance from the sample holder that is to be received. However, it is also possible for at least one temperature sensor to be arranged on the imaging optical unit and/or on a changer for the imaging optical unit. In this design it is provided that a temperature sensor be fastened directly on the objective. Immersion objectives are often provided with a cap for transporting immersion fluid toward the top of the objective so that a thermal element can be fed through such a cap so that the top of the thermal element, i.e. the temperature probe, is arranged directly between the objective and the sample holder in the immersion solution when operating the microscope. A temperature sensor can of course also be fastened directly on the objective or on an objective revolver in different ways and means such that the temperature probe is arranged close to the sample holder when operating the microscope. Reference is made in this respect to the exemplary embodiments further below.

In an advantageous design of an embodiment of the inventive concept, a further incubation space is provided next to the lower incubation space and above the microscope stage, the further incubation space being separate from the lower incubation space. There are therefore provided two incubation spaces that can preferably be incubated independently of each other. The term "can be incubated" here means that at least one target or desired temperature can be set. In addition, further parameters can be set, such as for example the composition of the atmosphere or the humidity. The upper incubation space that comprises the upper side of the microscope stage and a sample holder inserted therein can in particular exhibit an atmosphere that is being controlled in terms of temperature, composition, and humidity or is regulated in terms of desired values to be kept (see below). In an inverted microscope, the upper incubation space can additionally also comprise an illumination optical unit. The temperatures in the lower as well as in the upper incubation space are preferably identical.

Suitable incubation atmospheres of the upper incubation space contain air having a specified $CO_2$ content (carbon dioxide). It may also be desirable to carry out hypoxia experiments with an oxygen deficiency in the atmosphere. The temperature of the incubation atmosphere can typically be set in a range of environmental temperatures up to 50° C., the $CO_2$ range between 0.5 up to 20% and the $O_2$ range between 1 up to 18%. The humidity has to be set such that potential condensation is avoided or at least does not negatively impact the microscope components or the sample. Preferably at least the temperature, the humidity and the $CO_2$ content are regulated. In hypoxia experiments, the $O_2$ content is regulated via an $N_2$ supply. For the purposes mentioned, further sensors can be provided in addition to the mentioned temperature sensors for regulating the composition of the atmosphere.

The upper and the lower incubation space are, in a preferred embodiment, separated by the objective level that is essentially formed by the microscope stage, by a sample holder receptacle received in the opening of the microscope stage, and the sample holder received therein. The individual components may be bordering each other as far as possible flush without gaps. The upper incubation space can be realized as a cage incubator or as an incubated closed microscope housing part that comprises for example at least part of the transmitted light illumination device and the upper side of microscope stage and sample holder, it being possible to introduce the sample or the sample holder for examination in the sample space through a closable opening of this microscope housing part. It may be pointed out that in the upper incubation space also a stage top incubator solution can be realized where only the stage top incubator is incubated, in this case it also being possible in addition to keep the temperature in the upper incubation space on a desired target temperature.

In an advantageous design, the upper and the lower incubation spaces are in each case connected to an external heating and/or cooling unit that supplies both, via separate connecting lines, the external heating and/or cooling unit furthermore preferably setting the temperatures in the upper and lower incubation spaces to the same target temperature. If required, the composition of the atmosphere of the upper incubation space can be additionally regulated. A particularly comfortable solution is achieved when the two incubation spaces are connected separately to in each case at least one external heating and/or cooling unit that is associated with them. By supplying and/or discharging heated and/or cooled air a specified temperature can be set in the upper incubation space and the specified target temperature already discussed above in the lower incubation space.

An inverted microscope where the upper incubation space and the lower incubation space are surrounded by a common housing or bordering on a common housing has proven to be advantageous. The common housing can here surround in each case sidewalls of the upper and the lower incubation spaces or form them on its own. This enables a construction that is as compact as possible, of the inverted microscope where some microscope components are located in the upper and lower incubation space, the upper and the lower incubation space in each case forming separate microscope housing parts. In this embodiment, it is convenient when the housing exhibits a door or a flap that permits direct access to the upper incubation space, i.e. the object space.

Further advantages and designs of embodiments of the present invention result from the description and the attached drawings.

It has to be understood that the features mentioned above and still to be explained below can be used not only in the in each case specified combination but also in other combinations or in isolation without leaving the scope of the present invention.

In the drawings embodiments of the present invention are illustrated schematically using exemplary embodiments and described below with reference to the drawings.

The Figures are described below in a general manner. Identical reference symbols refer to structurally identical or at least functionally identical elements.

Figure 1:
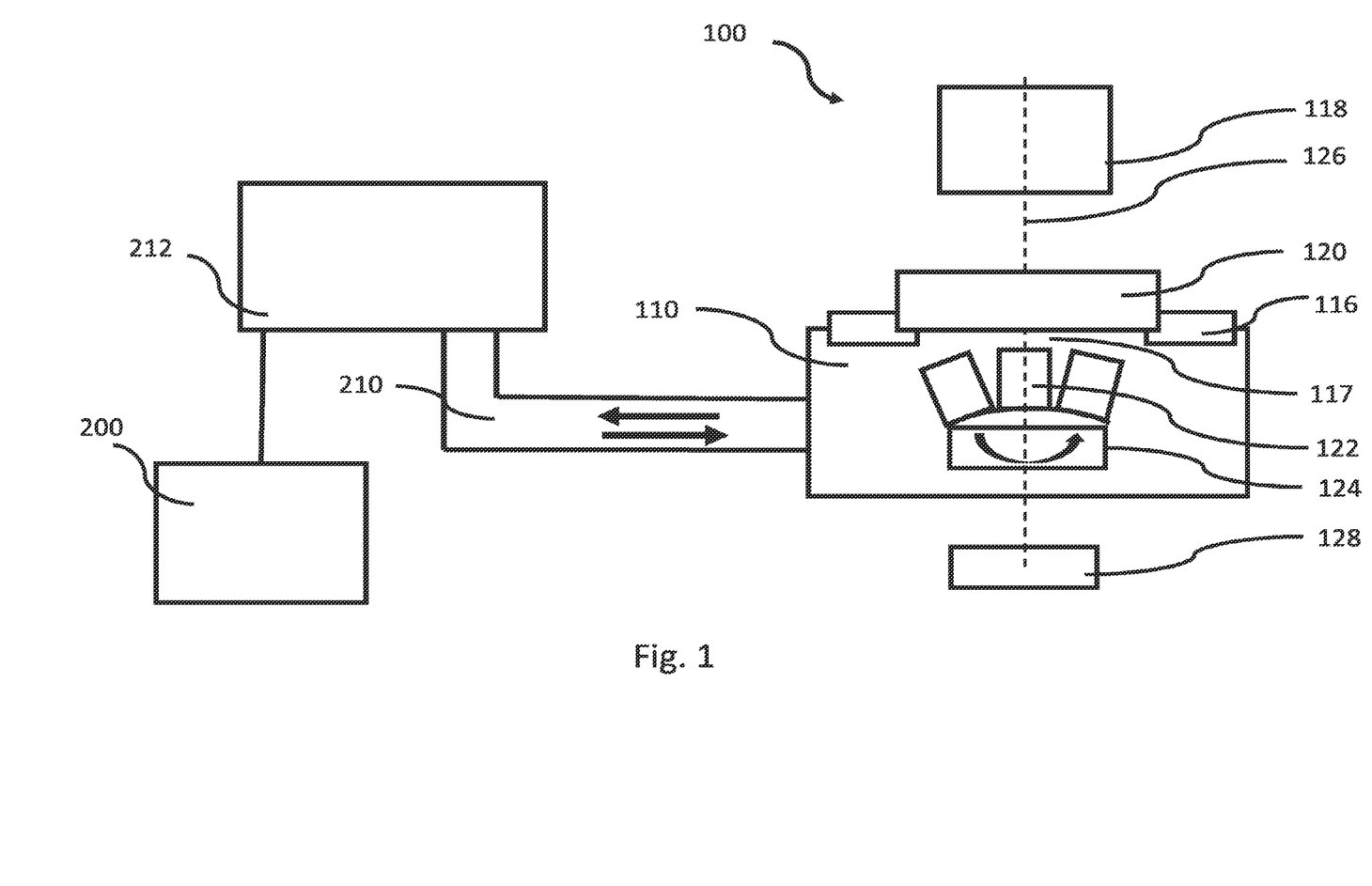
FIG. 1 shows a first exemplary embodiment of an inverted microscope.

FIG. 1 shows an embodiment of an inverted microscope 100 that has elements of an illumination optical unit 118, a microscope stage 116, an objective changer 124 having several objectives, the imaging optical unit 122 representing one of the objectives that has been pivoted into the optical axis 126, as well as finally a detection device 128, for example in the form of a camera. These elements of an inverted microscope are known per se to a person skilled in the art and therefore should not be explained here in more detail. The microscope stage 116 exhibits an opening 117 that is designed in a manner so as to receive a sample holder 120. The microscope stage 116 can therefore exhibit a receptacle into which the sample holder 120 is inserted. This sample holder 120 can be a multiwell plate or a Petri disk in which for example live cells are received. During operation of the inverted microscope 100, a transmitted light illumination beam path that is produced by the illumination optical unit 118 passes through the sample holder 120 through the opening 117 in the microscope stage 116 so that the sample contained in the sample holder 120 is being illuminated. The observation beam path originating from the sample passes through the imaging optical unit 122 to the detection device 128 that provides a microscopic image of the sample. For reasons of clarity, the representation of further elements present in the imaging beam path such as tube lenses, filters, etc. has been dispensed here deliberately.

As can be gathered from FIG. 1, a lower incubation space 110 is formed by a housing section that comprises the imaging optical unit 122, in this exemplary embodiment the entire objective changer 124. Toward the top, the lower incubation space 110 is delimited by the microscope stage 116 and the sample holder 120 received therein. Since according to the invention a specified target temperature is to be set in the lower incubation space 110, it is practical to thermally insulate the housing sections mentioned that form the lower incubation space 110. Heat exchange is then limited, as desired, first of all to the sample holder 120 inserted in the microscope stage 116. The temperature of the sample can thereby be influenced directly. This is valid all the more for adherent cells that are located at the bottom of the sample holder.

The inverted microscope 100 according to FIG. 1 further comprises an external heating and/or cooling unit 212 that is connected to the lower incubation space 110 via a connecting line 210 that serves to supply and/or discharge heated and/or cooled air. A specified target temperature in the lower incubation space 110 can thereby be set. The inverted microscope 100 further comprises according to FIG. 1 a control unit 200 that correspondingly drives the heating and/or cooling unit 212 so that the specified target temperature can be set. For this purpose, a temperature sensor is provided whose arrangement and function are detailed in connection with the Figures that now follow.

It may be emphasized at this point that the elements of the inverted microscope explained in the present Figures are to be disclosed to a person skilled in the art not only in the respective illustrated combination but also in other combinations that can be gathered by a person skilled in the art by transfer from one Figure into the other without this always having to be explained explicitly.

Figure 2:
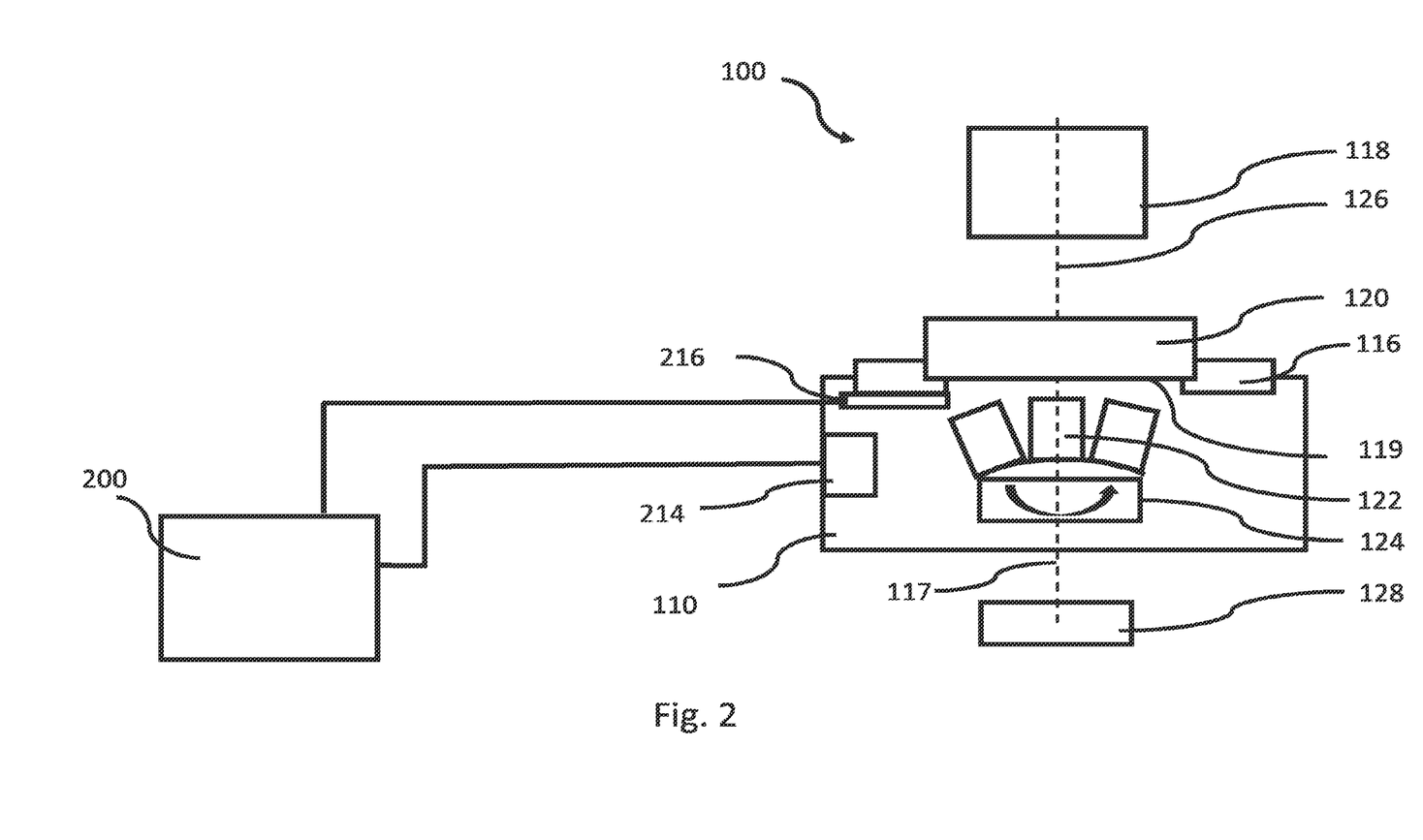
FIG. 2 shows a second exemplary embodiment of an inverted microscope.

FIG. 2 now shows a similar arrangement as FIG. 1 with the difference that the heating and/or cooling unit is an integrated heating and/or cooling element 214 that is arranged inside the lower incubation space 110. The integrated heating and/or cooling element 214 is in particular a Peltier element. The integrated heating and/or cooling element 214 is connected to a control unit 200. There is further shown in FIG. 2 a temperature sensor 216 that is arranged in the lower incubation space 110 and whose measurement signal is transmitted to the control unit 200. Using the measured actual signal of the temperature, the control unit 200 can drive the integrated heating and/or cooling element 214 to set the specified target temperature inside the lower incubation space 110. The arrangement shown here can of course also be transferred to the arrangement illustrated in FIG. 1 having the external heating and/or cooling unit 212. As can be gathered from FIG. 2, the temperature probe of the temperature sensor 216 is located in the vicinity of the lower side 119 of the sample holder 120 or in the proximity of the lower side of the microscope stage 116 so that the temperature prevailing there can be measured as precisely as possible.

Figure 3:
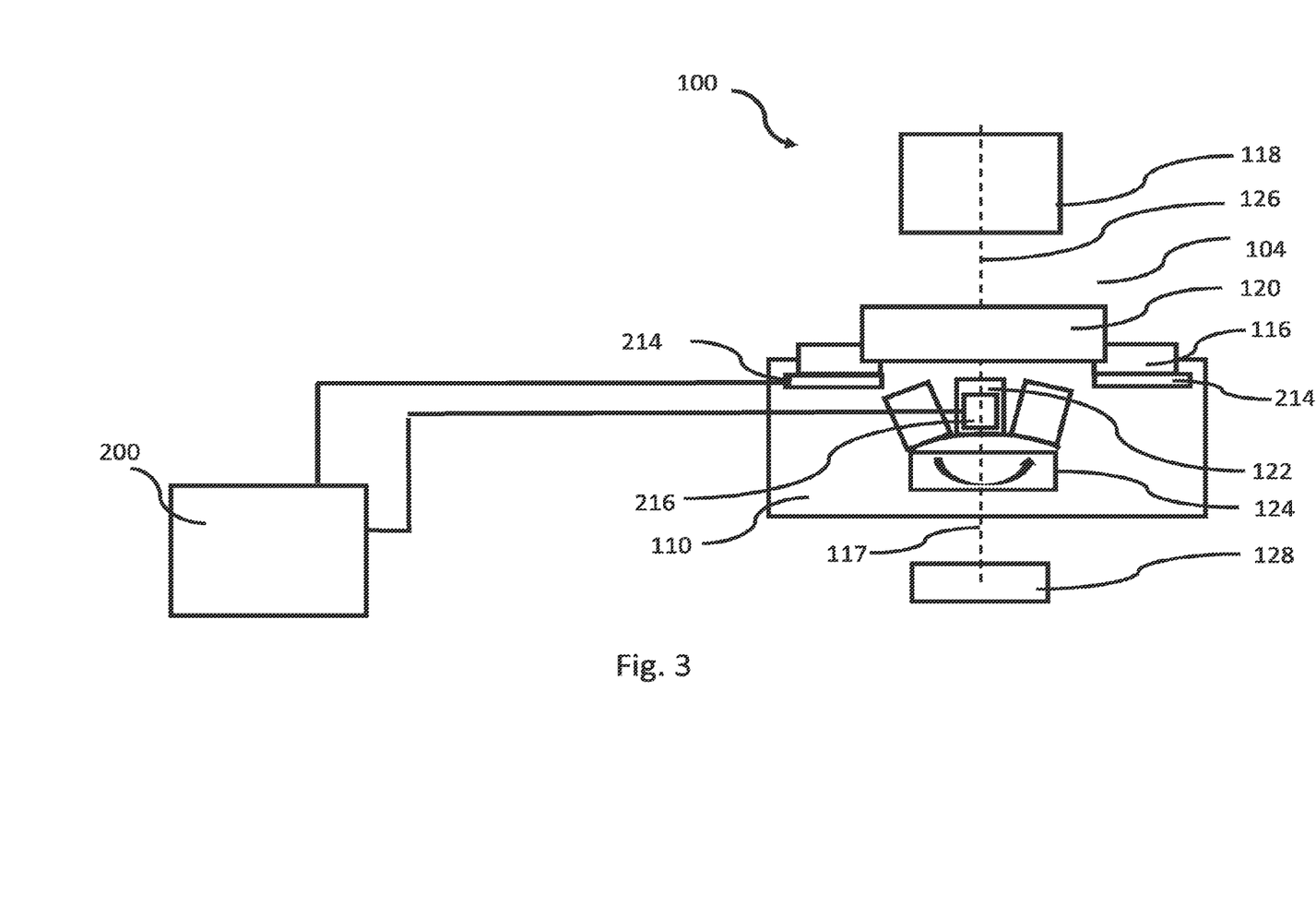
FIG. 3 shows a third exemplary embodiment of an inverted microscope.

FIG. 3 shows an arrangement slightly changed relative to FIG. 2 of an inverted microscope 100. Again only the respective changes will be dealt with. Similar to FIG. 2, the heating and/or cooling unit is an integrated heating and/or cooling element 214. However, the temperature sensor 216 is now arranged directly on the imaging optical unit 122. Further explanations of this arrangement can be found further below in the exemplary embodiments. This arrangement is also advantageous since the temperature of the imaging optical unit 122, in particular in the case of immersion objectives, has to correspond to the desired target temperature so as to prevent the heat immission into or the heat emission from the lower examined sample.

It may be emphasized here that also several temperature sensors 216 such as a combination of the temperature sensors illustrated in FIGS. 2 and 3 are possible and can be appropriate. The control unit 200 can process the signals of several temperature sensors, for example form average values or use the values of a sensor when the values of the others are not plausible, or finally verify the values of the one sensor in terms of plausibility referring to the values of the other sensors.

Figure 4:
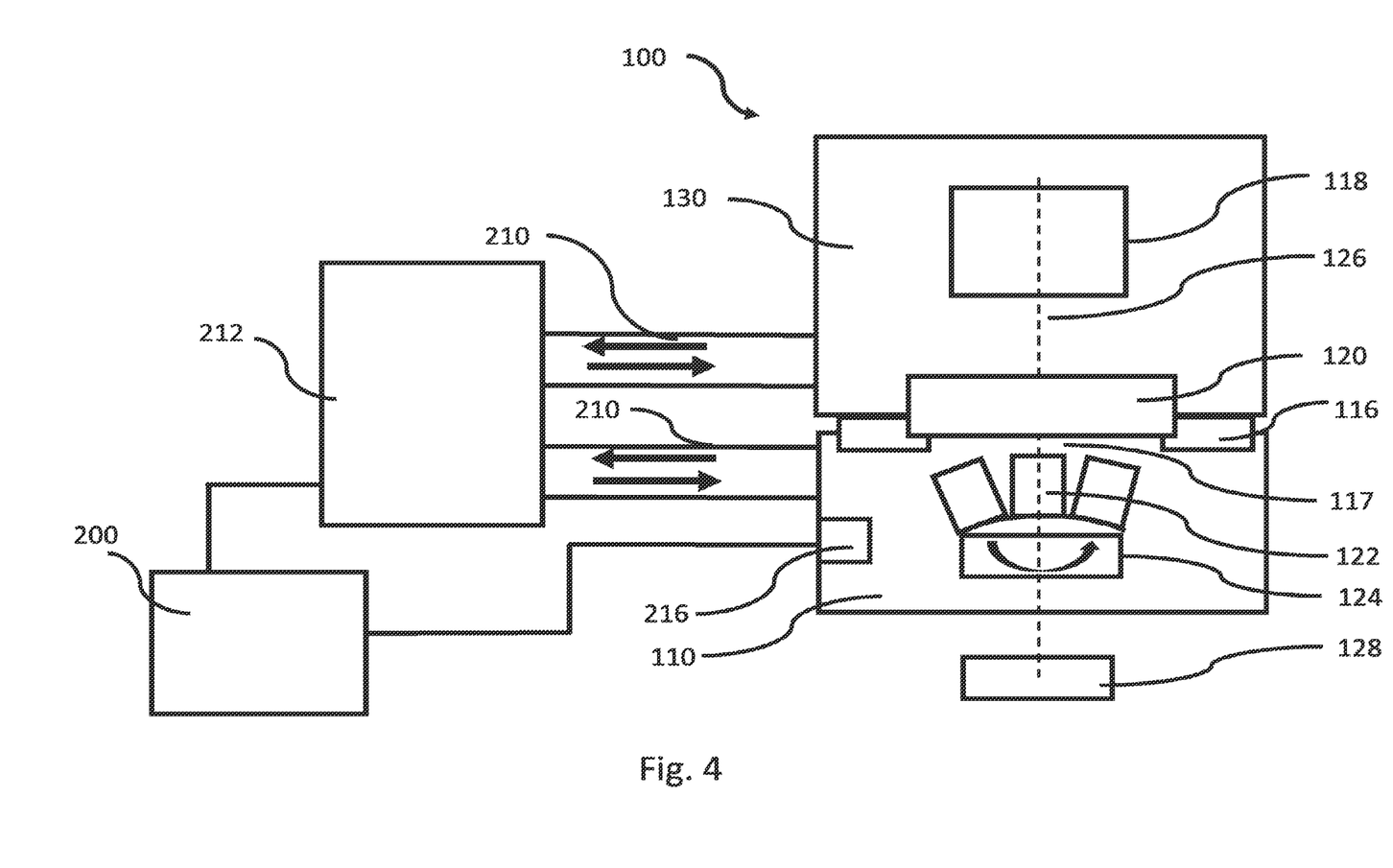
FIG. 4 shows a fourth exemplary embodiment of an inverted microscope.

FIG. 4 shows a further embodiment of an inverted microscope 100 where an upper incubation space 130 is provided that comprises the illumination optical unit 118 and is delimited toward the bottom by the upper side of the microscope stage 116 and the upper side of the sample holder 120 received therein. The upper incubation space 130 can in particular be formed by a housing section of the inverted microscope 100. The upper incubation space 130 hereby forms a detached separate incubatable sample space. It contains an interface to an external heating and/or cooling unit 212, the unit 212 being connected via a connecting line 210 to the upper incubation space 130.

Referring to the lower incubation space 110 illustrated in FIG. 4, the analog statements apply as concerning the exemplary embodiments according to FIGS. 1 and 2. In the lower incubation space 110, a temperature sensor 216 is arranged that is in communication connection with an (external) control unit 200. This control unit 200 again drives the external heating and/or cooling unit 212. The latter is connected to the lower incubation space 110 using a further connecting line 210. Using an external heating and/or cooling unit 212, the upper incubation space 130 and the lower incubation space 110 can thereby be incubated, i.e. by the supply/discharge of heated/cooled air a specified temperature in the upper incubation space 130 and the specified target temperature in the lower incubation space 110 can be set, both temperatures preferably being identical. Furthermore, by a corresponding design of the external heating and/or cooling unit 212 the air supplied into the upper connecting line 210 can be influenced in terms of its composition such as by adding oxygen, nitrogen, carbon dioxide and/or water, for setting a desired incubation atmosphere in the upper incubation space 130. Such an incubation atmosphere is particularly favorable for certain experiments on live cells.

Figure 5:
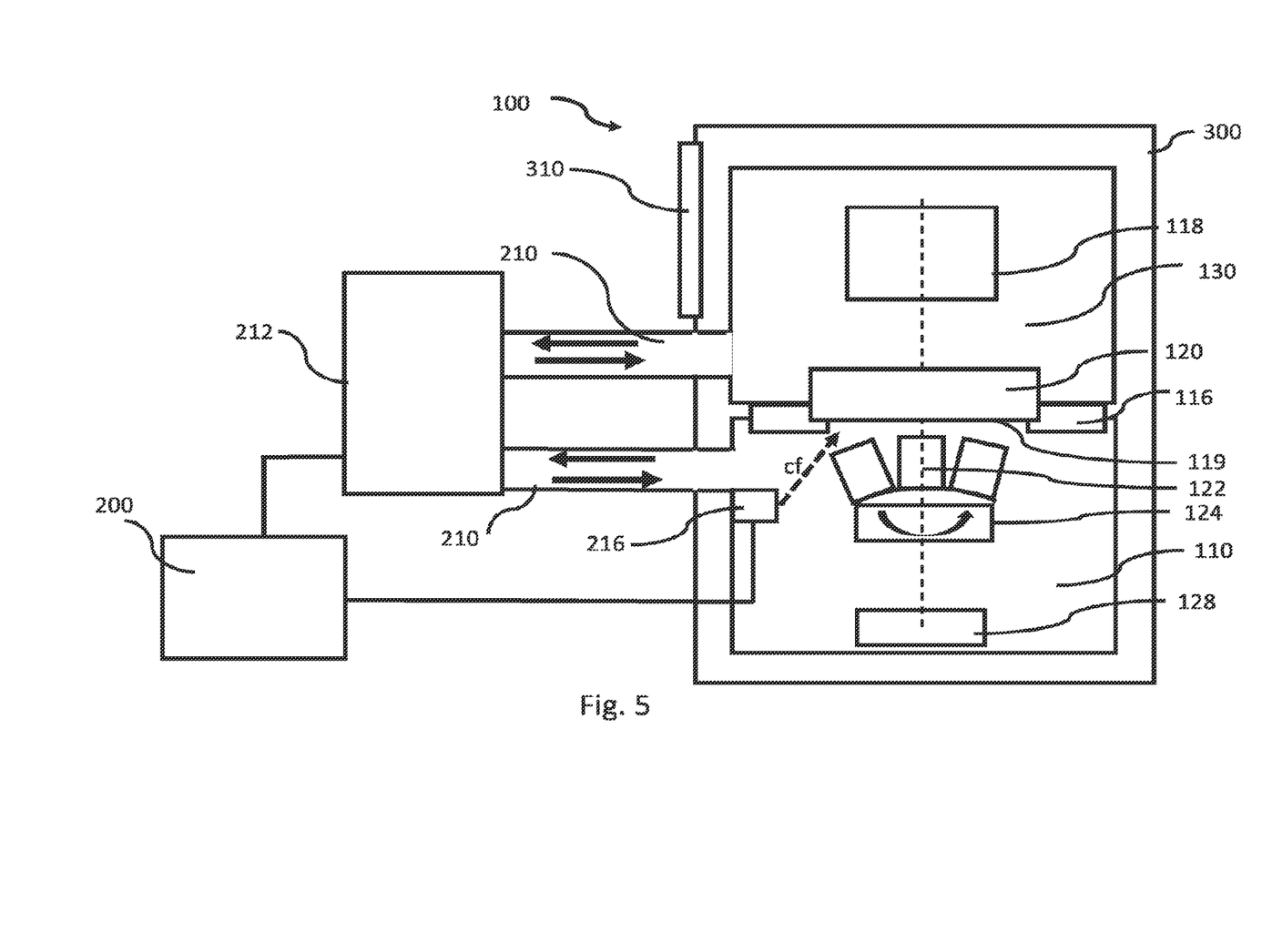
FIG. 5 shows a fifth exemplary embodiment of an inverted microscope.

FIG. 5 illustrates a slightly changed embodiment of an inverted microscope 100 according to FIG. 4. A common housing 300 surrounds the upper incubation space 130 and the lower incubation space 110. A door or flap 310 permits direct access to the upper incubation space 130 as is illustrated very schematically in FIG. 5. It may be noted that the door or flap 310 that have been shown can be also mounted directly to the upper incubation space 130 according to FIG. 4. The symbol "cf" furthermore shows a non-contacting measurement of the temperature sensor 216 that is arranged and aligned such that it measures without contact the temperature on the lower side 119 of the sample holder 120. Apart from this, reference is made to the exemplary embodiments according to FIG. 4.

Figure 6:
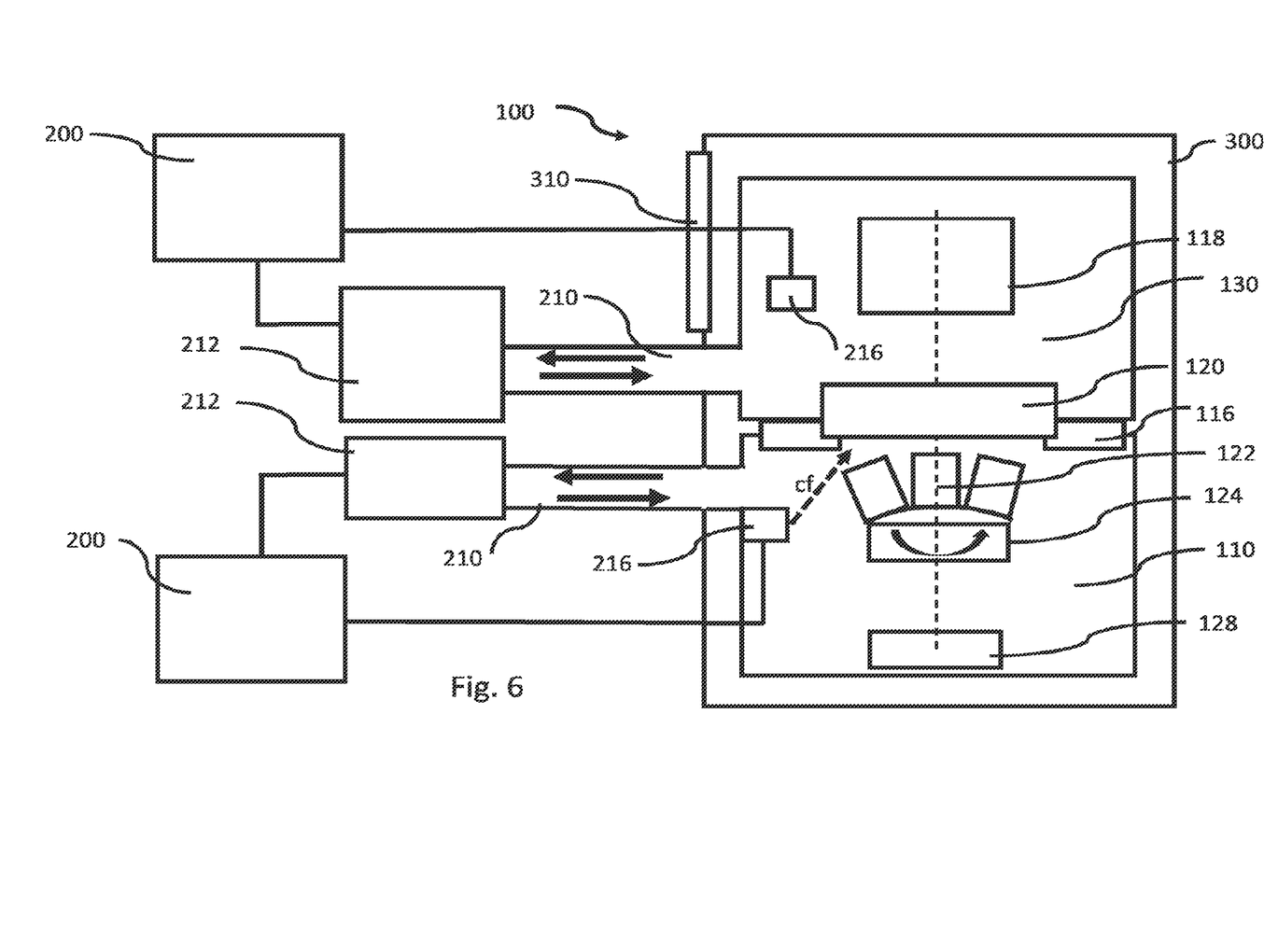
FIG. 6 shows a sixth exemplary embodiment of an inverted microscope.

FIG. 6 illustrates a further embodiment of an inverted microscope 100 starting from FIG. 5, again only the differences with respect to FIG. 5 having to be detailed. As can be gathered from FIG. 6, a separate external heating and/or cooling unit 212 is associated with the upper incubation space 130 and connected thereto using the upper connecting line 210. There is additionally arranged in the lower incubation space 110 an external heating and/or cooling unit 212 that is connected to the lower incubation space 110 via the lower connecting line 210. With respect to the incubation of the lower incubation space 110, reference is being made insofar to the description above. Referring to the incubation of the upper incubation space 130, in this exemplary embodiment an incubation totally independent from the incubation of the lower incubation space 110 is possible. A separate temperature sensor 216 is arranged for this purpose in the upper incubation space 130 that communicates with a separate external control unit 200 so as to transmit up-to-date actual temperature values. The external control unit 200 correspondingly controls the external heating and/or cooling unit 212 assigned to the upper incubation space 130 so that it sets a specified desired temperature in the upper incubation space 130 by supplying/discharging heated/cooled air. In this embodiment illustrated in FIG. 6, two incubation types that are totally independent from each other can be realized. The volume of the upper incubation space 130 can be controlled or regulated in terms of temperature, gas composition, and in particular humidity in its own circulation for ensuring optimum conditions for the microscopic examination of live cells. In contrast, in the volume of the lower incubation space 110 the type of the composition of the atmosphere is of little relevance, an increase in the humidity would however be counterproductive. It is here accordingly sufficient to introduce in particular dry air having a specific temperature, so as to ensure advantageous and uniform temperatures on the lower side of the sample holder 120. This can be guaranteed by a low air flow that flows around the imaging optical unit 122 and the lower side 119 of the sample holder 120. Here it is particularly useful to keep the temperatures in the upper and in the lower volume of the respective incubation spaces 130, 110 to an identical temperature value so as to keep both spaces in perfect equilibrium in terms of the temperature. It is in particular advantageous if both incubation controls can be driven via a joint software interface.

While FIGS. 1 to 6 deal with different possibilities of the principle setup of an inverted microscope according to embodiments of an inventive concept, it being possible to combine individual variants as already mentioned, the setup and the arrangement of sensors, heating and/or cooling units, and control units are to be dealt with below. The following exemplary embodiments can be combined with each other and also with FIGS. 1 to 6 without each individual combination having to be dealt with explicitly.

Figure 7:
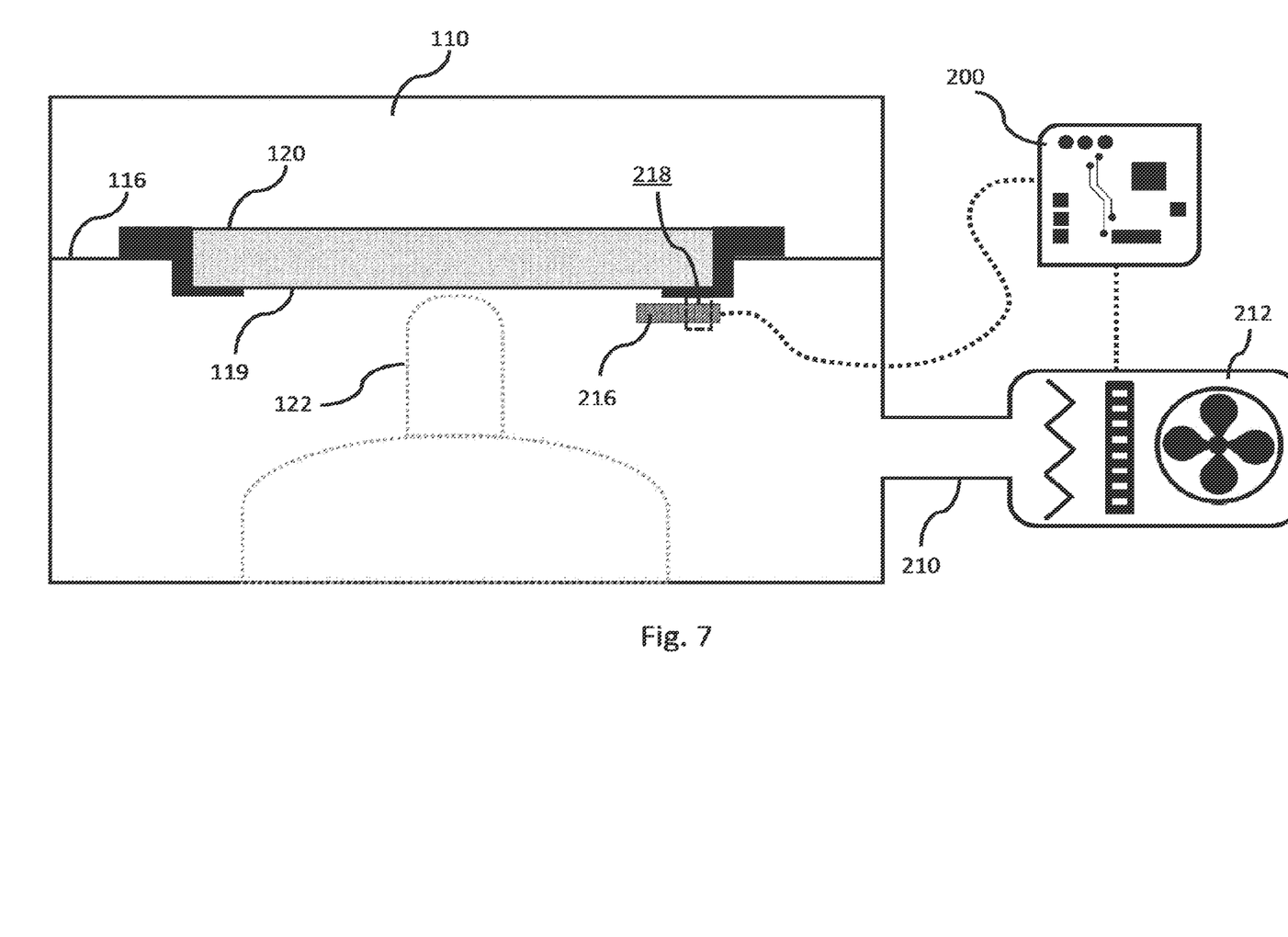
FIG. 7 shows a first embodiment of the incubation of the lower incubation space of an inverted microscope.

FIG. 7 shows a detail of the lower incubation space 110 as has been detailed in connection with FIGS. 1 to 6. The imaging optical unit 122 is shown only schematically. The microscope stage has been designated 116, an adapter or a receptacle has been inserted into its opening and is designed for receiving the sample holder 120. The adapter is to be regarded below as part of the microscope stage 116. As can be gathered from FIG. 7, a fastening device for example in the shape of a cable clamp 218 or of a clip is provided on the lower side of the microscope stage 116, in particular on the lower side of the adapter and on which a temperature sensor 216 can be fastened. The temperature sensor, in particular its tip or the temperature probe of the sensor, is designed such that the temperature is measured in the area of the lower side 119 of the sample holder 120.

As can be further gathered from FIG. 7, the temperature sensor 216 is connected via a sensor cable to the control unit 200 that in turn drives the external heating and/or cooling unit 212. The latter is again connected to the lower incubation space 110 via a connecting line 210. The heating and/or cooling unit 212 can contain one or more of the elements that have been illustrated symbolically: heating coil, Peltier element, fan. Heated or cooled air can thereby be supplied to the lower incubation space 110 so as to set a specified target temperature. The up-to-date actual temperature is measured by the temperature sensor 216 and the corresponding signal is fed to the control unit 200 that then drives the heating and/or cooling unit 212 in a known manner.

Figure 8:
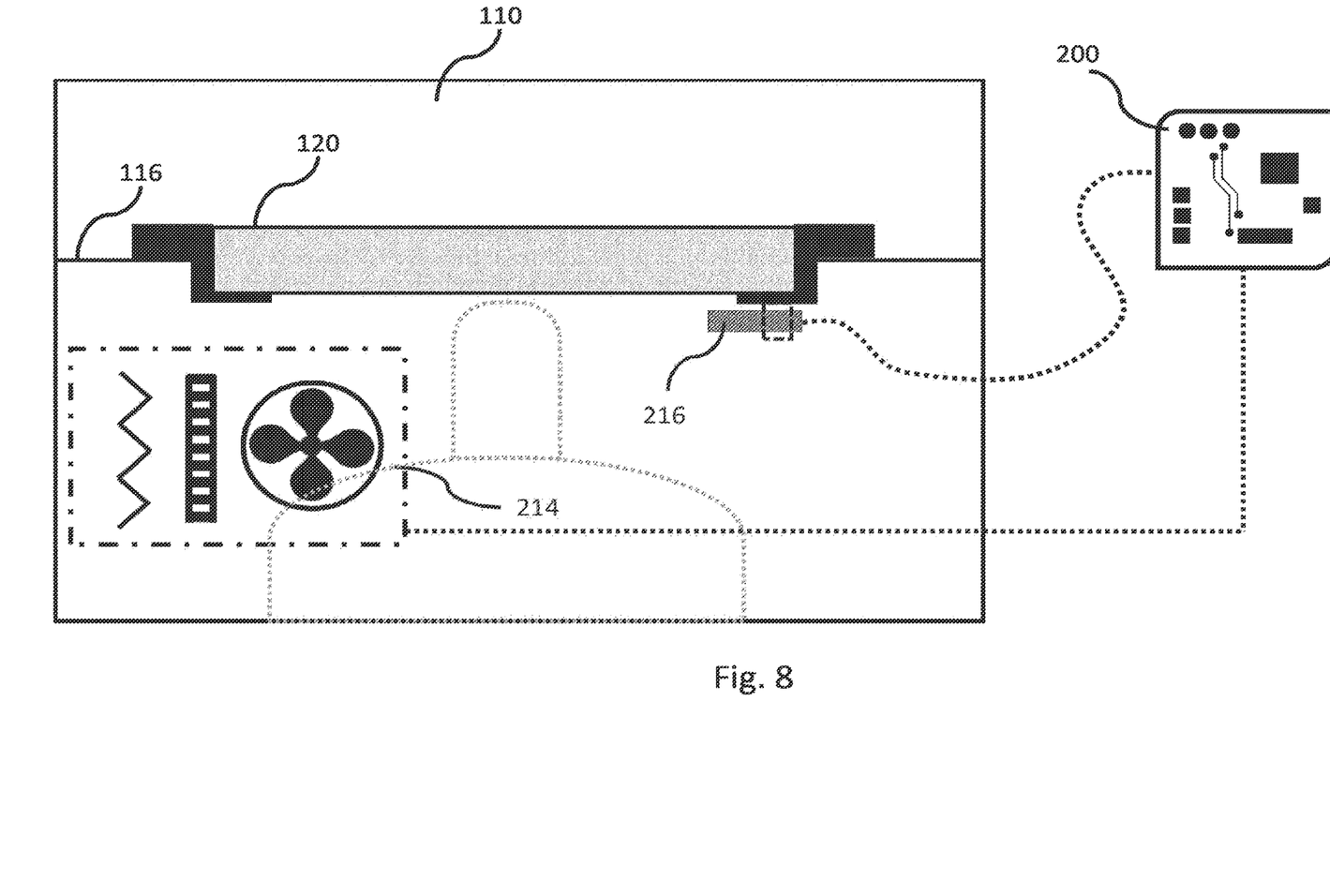
FIG. 8 shows a second embodiment of the incubation of the lower incubation space of an inverted microscope.

FIG. 8 essentially shows the same conditions as FIG. 7 with the difference that the heating and/or cooling unit is designed in FIG. 8 as an integrated heating and/or cooling unit 214. The latter is therefore inside the lower incubation space 110. This is in particular appropriate when there is sufficient room in the incubation space 110. Energy losses on account of the conduction of the medium via a connecting line can also be dispensed here. An individual heating and/or cooling element 214 can also be used in place of the heating and/or cooling unit. All other designs concerning this exemplary embodiment match those of FIG. 7 so that reference is made to these explanations in order to avoid repetitions.

Figure 9:
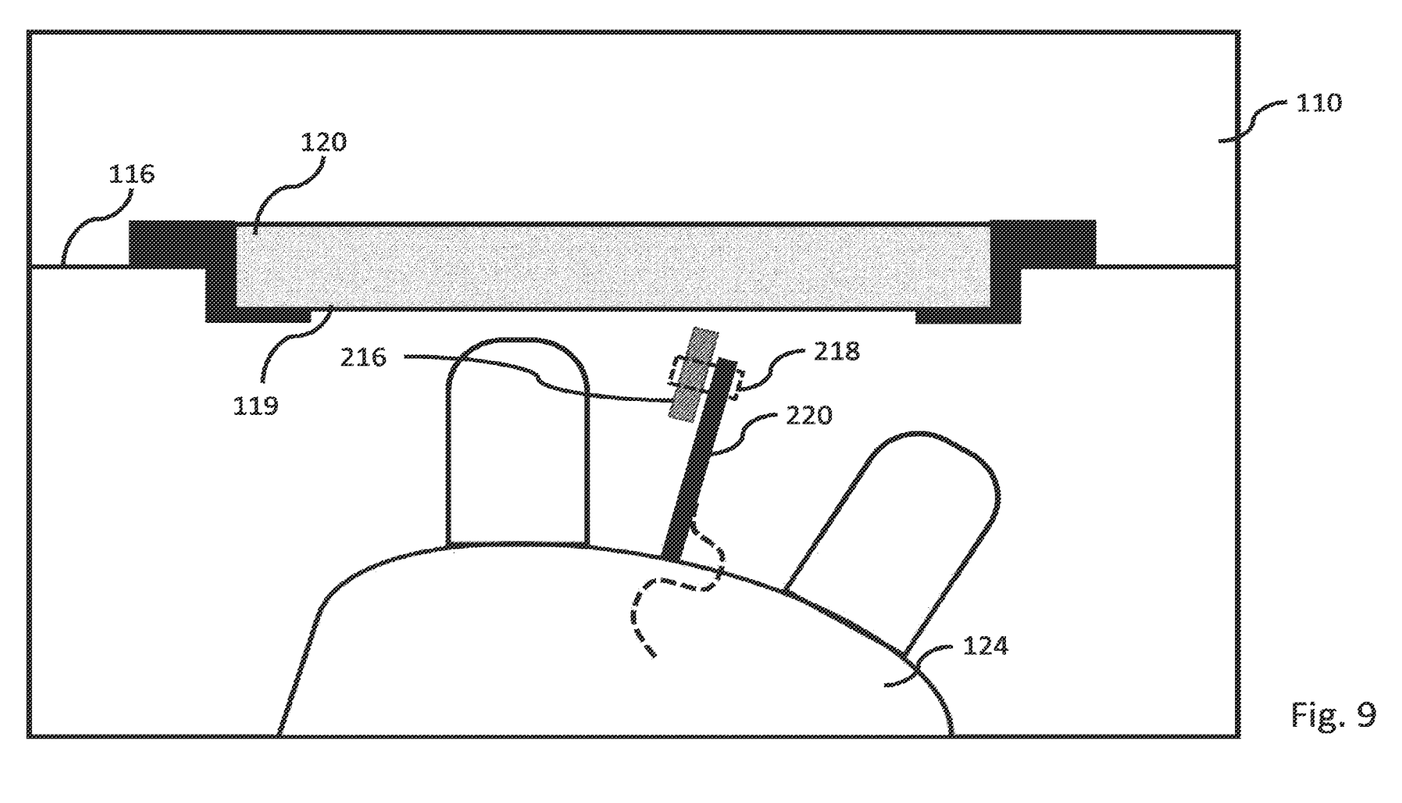
FIG. 9 shows a third embodiment of the incubation of the lower incubation space of an inverted microscope.

FIG. 9 shows a further possibility of attaching a temperature sensor 216, reference being made to FIGS. 7 and 8 concerning the designs of the associated heating and/or cooling unit or control unit. According to FIG. 9, an objective changer 124 is present in the lower incubation space 110 below the microscope stage 116 and the sample holder 120 received therein and is shown here schematically. It has to be noted that only a detail of the lower incubation space 110 is illustrated. In this exemplary embodiment, the temperature sensor 216 is attached by means of a suitable fastening means, for example again the mentioned cable clamp 218 or a clip, in axial fashion to the basic body of the objective changer 124. The fastening means is designated 220 and in this case forms a narrow bar or rod. The temperature sensor 216 is again connected to a control unit 200 by means of a sensor cable (compare the above explanations).

Figure 10:
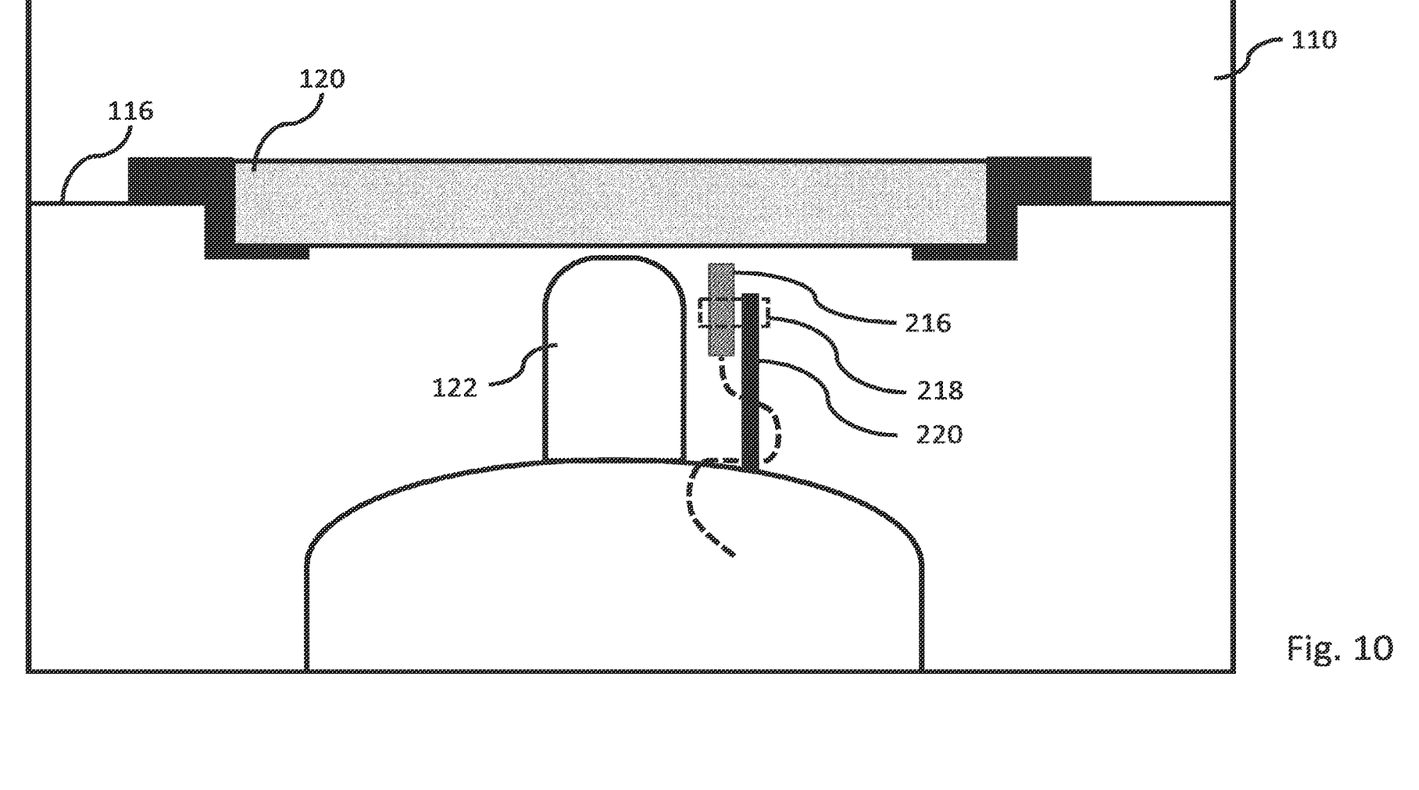
FIG. 10 shows a fourth embodiment of the incubation of the lower incubation space of an inverted microscope.

FIG. 10 again shows another variant similar to the embodiment according to FIG. 9. The temperature sensor 216 is connected here to the basic body of a single-objective revolver or of the imaging optical unit 122 via a paraxial fastening means 220. The temperature sensor 216 and the fastening means 220 can again be connected using a plastic cable clamp 218. As already in the previous Figures, the temperature sensor 216 enables a contactless temperature measurement in the vicinity of objective/imaging optical unit and sample floor/lower side of the sample holder.

FIG. 11 again shows another possibility of arranging the temperature sensor. Reference is made to the previous Figures for all other details.

Figure 11:
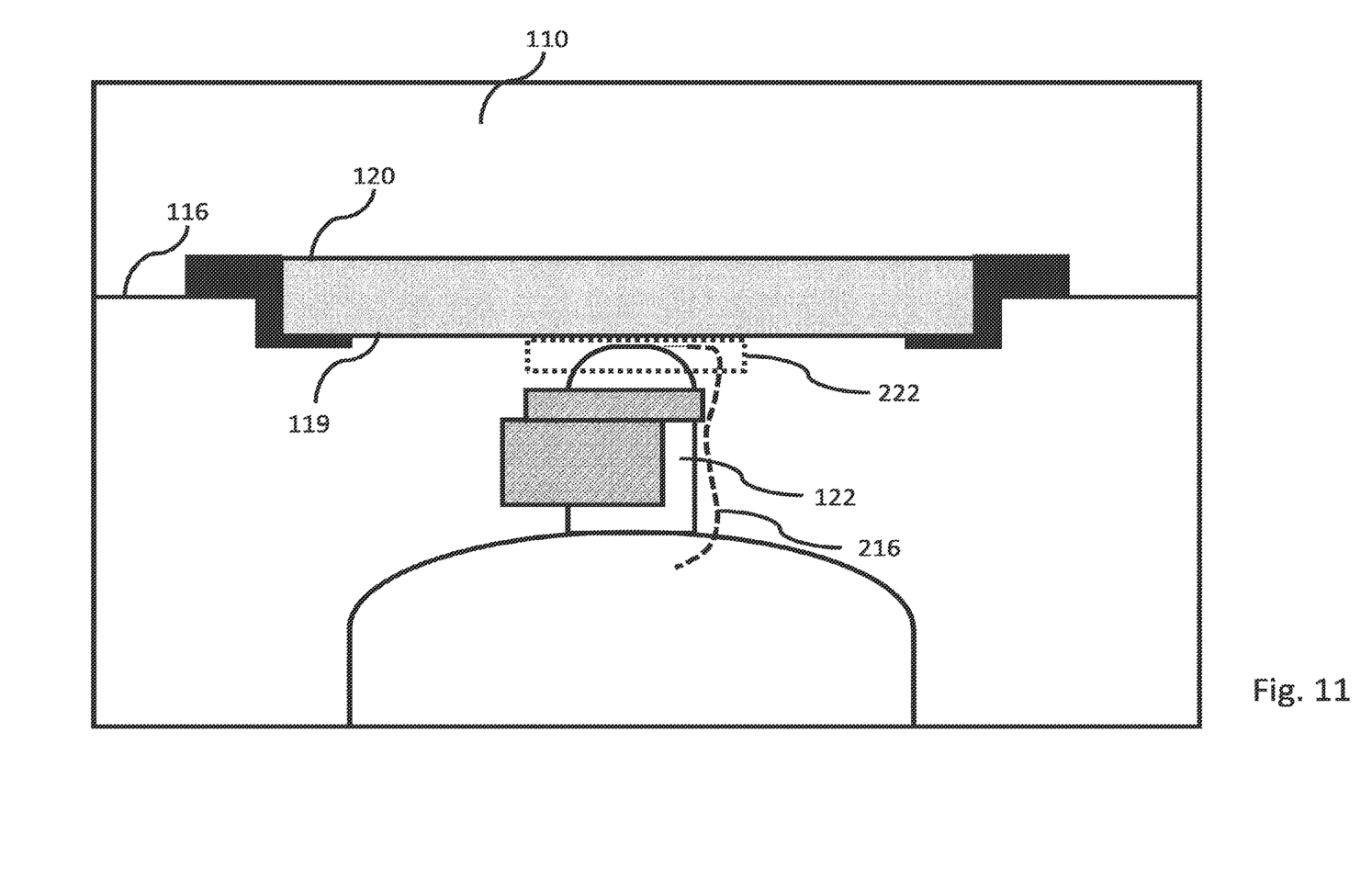
FIG. 11 shows a fifth embodiment of the incubation of the lower incubation space of an inverted microscope.

The arrangement illustrated in FIG. 11 is particularly suitable for immersion objectives, in particular so-called "MotCorr objectives" 122. In addition to movable lens elements, they also exhibit an immersion means dispenser 222 that surrounds the upper side of the object in the shape of a cap so as to transport immersion means to the objective tip. An immersion solution can be introduced in this manner between the objective and the lower side 119 of the sample holder 120. As is illustrated in FIG. 11, a temperature sensor 216 can for example be fed in the form of a very fine thermal element through the cap or the immersion means dispenser 222 to the objective tip. The sensor 215 can thereby measure directly the temperature at the lower side 119 of the sample holder 120.

The embodiments presented illustrate that embodiments of the inventive concept permits precise temperature measurement on the lower side of the sample holder in the lower incubation space and thereby enables to positively influence the sample temperature by correspondingly setting a target temperature.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

100 Inverted microscope
110 Lower incubation space
116 Microscope stage
117 Opening
118 Illumination optical unit
119 Lower side of the sample holder
120 Sample holder
122 Imaging optical unit
124 Objective changer
126 Optical axis
128 Detection device/camera
130 Upper incubation space
200 Control unit
210 Connecting line
212 External heating and/or cooling unit
214 Integrated heating and/or cooling element
216 Temperature sensor
218 Cable clamp
220 Fastening means
222 Immersion means dispenser
300 Housing
310 Flap, door
cf Symbol for contact-free measurement

The invention claimed is:

1. An inverted microscope comprising:
a microscope stage having an opening configured to transmit light illumination, the microscope stage being configured to receive a sample holder,
an imaging optical unit arranged below the microscope stage,
a closed lower incubation space surrounding at least the imaging optical unit and arranged adjacent to a lower side of the microscope stage, and
at least one temperature sensor arranged on the lower side of the microscope stage and at a distance from the sample holder that is to be received,
wherein the inverted microscope is configured such that a temperature in the lower incubation space is adjustable to a specifiable target temperature, and wherein a measurement signal of the at least one temperature sensor serves to set the specifiable target temperature.

2. The inverted microscope according to claim 1, wherein the inverted microscope comprises a heating and/or cooling unit that sets the temperature in the lower incubation space.

3. The inverted microscope according to claim 2, wherein the heating and/or cooling unit is at least one external heating and/or cooling unit to which there is connected the lower incubation space via at least one connecting line, wherein the specifiable target temperature can be set in the lower incubation space by feeding and/or extracting heated and/or cooled air.

4. The inverted microscope according to claim 2, wherein the heating and/or cooling unit is an integrated heating and/or cooling unit that is arranged in the lower incubation space and that sets the specifiable target temperature in the lower incubation space by heating or cooling.

5. The inverted microscope according to claim 2, wherein the inverted microscope comprises a control unit that comprises a communication connection to the at least one temperature sensor, so as to convey a measurement signal produced by the at least one temperature sensor to the control unit and that drives the heating and/or cooling unit so as to set the specifiable target temperature in the lower incubation space.

6. The inverted microscope according to claim 1, wherein the at least one temperature sensor is configured to measure the temperature on the lower side of the microscope stage.

7. The inverted microscope according to claim 1, wherein a separate upper incubation space is provided above the microscope stage.

8. The inverted microscope according to claim 7, wherein the lower incubation space and the upper incubation space can be incubated independently from each other.

9. The inverted microscope according to claim 7, wherein the lower incubation space and the upper incubation space are connected in each case via separate connecting lines with an external heating and/or cooling unit that supplies both, wherein by supplying and/or discharging heated and/or cooled air, a specifiable upper incubation temperature can be set in the upper incubation space and a specifiable lower incubation target temperature in the lower incubation space.

10. The inverted microscope according to claim 7, wherein the upper incubation space and the lower incubation space are surrounded by a common housing or border on a common housing.

11. The inverted microscope according to claim 10, wherein the housing surrounds the entire inverted microscope and the upper incubation space and the lower incubation space.

12. The inverted microscope according to claim 11, wherein the housing exhibits a door or a flap that permits direct access to the upper incubation space.

13. The inverted microscope according to claim 7, wherein the lower incubation space and the upper incubation space are connected in each case via separate connecting lines with an external heating and/or cooling unit that supplies separately to in each case at least one external heating and/or cooling unit that is assigned to them separately, wherein by supplying and/or discharging heated and/or cooled air, a specifiable upper incubation temperature can be set in the upper incubation space and a specifiable lower incubation target temperature in the lower incubation space.

\* \* \* \* \*